Inventor
Richard H. Peterson
Donald H. Sweet
Attorney

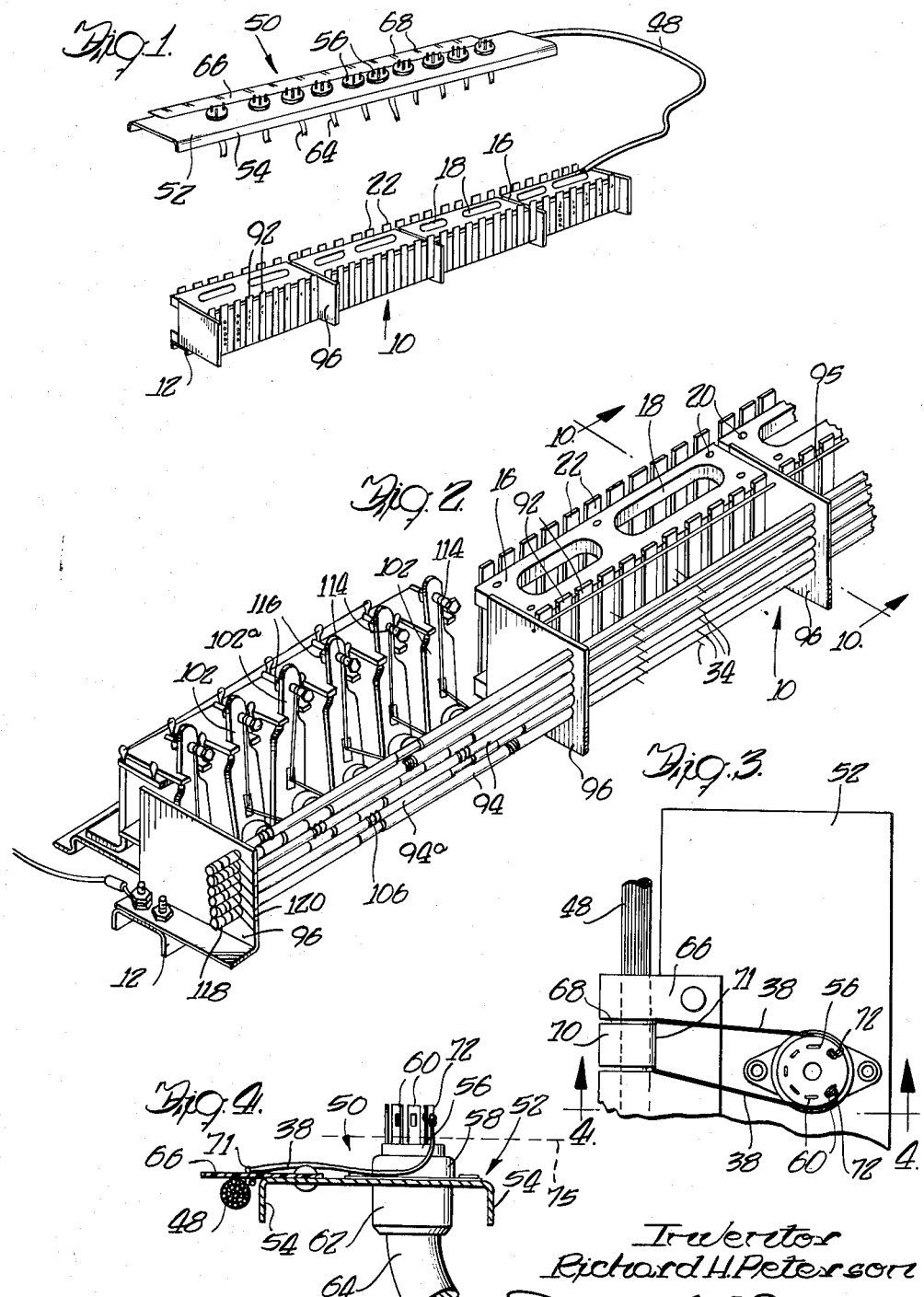
March 27, 1962
R. H. PETERSON
3,027,418
ELECTRICALLY INTERCONNECTED NETWORK
Filed Nov. 25, 1957
5 Sheets-Sheet 1
Inventor
Richard H. Peterson
Donald H. Sweet
Attorney March 27, 1962 R. H. PETERSON 3,027,418
ELECTRICALLY INTERCONNECTED NETWORK
Filed Nov. 25, 1957 5 Sheets-Sheet 2

March 27, 1962 R. H. PETERSON 3,027,418
ELECTRICALLY INTERCONNECTED NETWORK
Filed Nov. 25, 1957 5 Sheets-Sheet 3
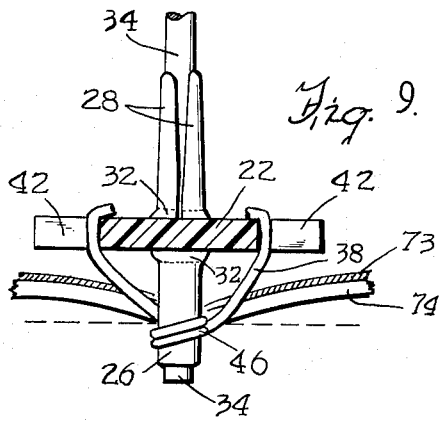
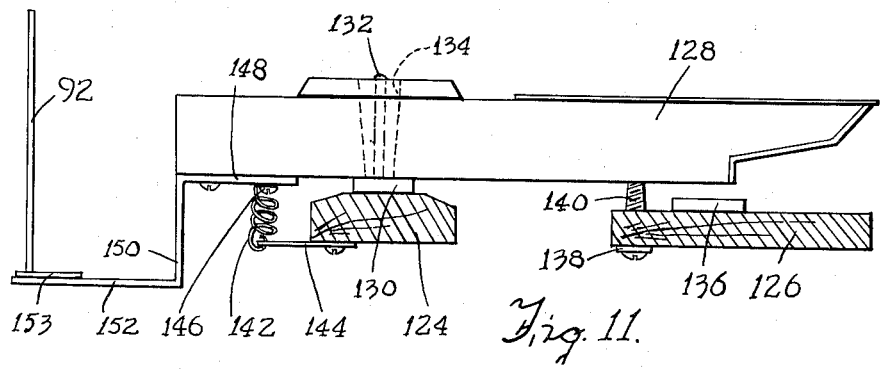
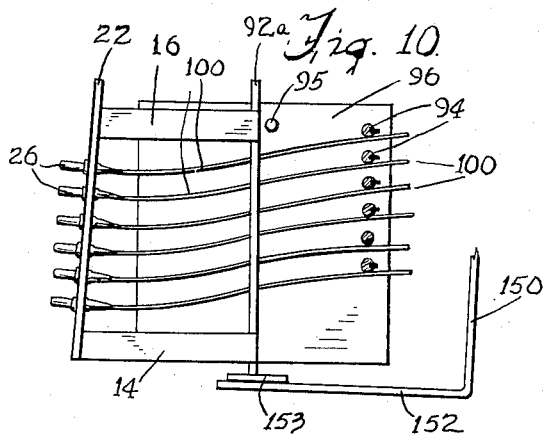
Inventor
Richard H. Peterson
Donald H. Sweet
Attorney

Fig. 12

March 27, 1962 R. H. PETERSON 3,027,418
ELECTRICALLY INTERCONNECTED NETWORK
Filed Nov. 25, 1957 5 Sheets-Sheet 5
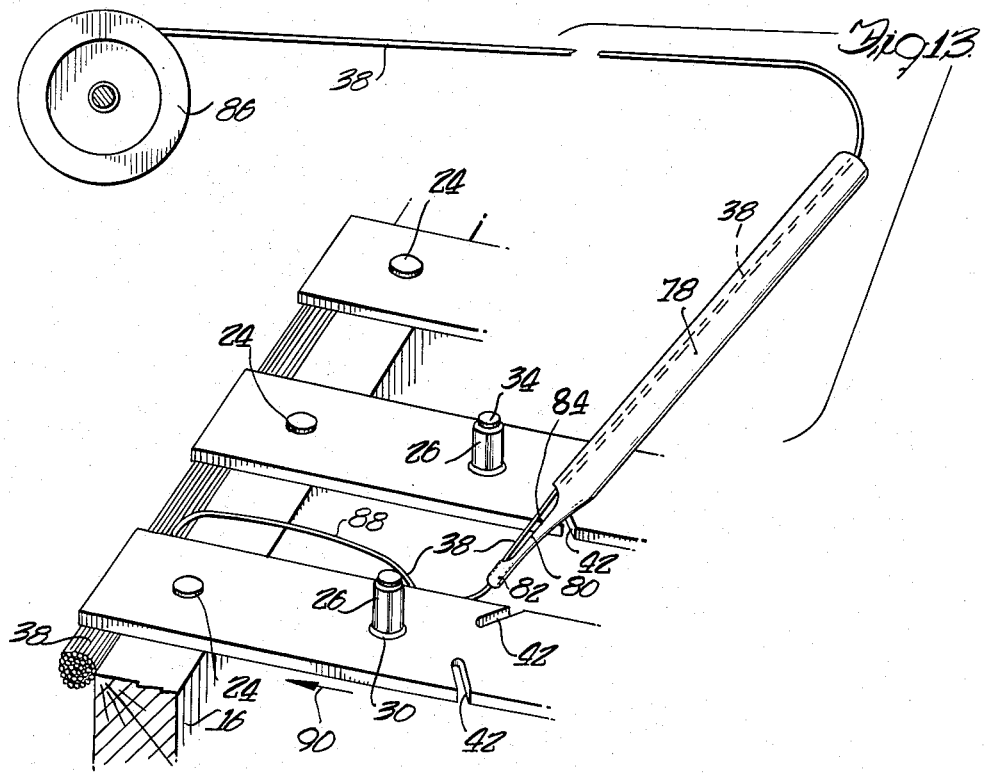
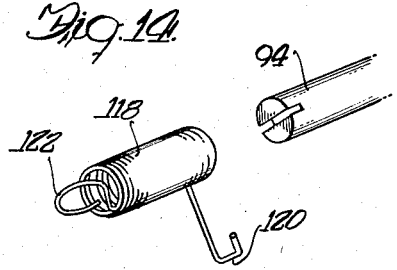
Inventor
Richard H. Peterson
Donald H. Sweet
Attorney United States Patent Office 3,027,418
Patented Mar. 27, 1962

1

3,027,418
ELECTRICALLY INTERCONNECTED NETWORK
Richard H. Peterson, 10108 Harnew Road E.,
Oaklawn, Ill.
Filed Nov. 25, 1957, Ser. No. 698,734
6 Claims. (Cl. 174—72)

This invention relates to systems of electrical wiring, particularly the wiring required in electrically operated musical instruments, such as organs. All modern pipe organs employ electrically controlled air valves that control the speaking of the various notes of the organ. Such organs include hundreds, and frequently thousands, of pipes that must be selectively operated through a complicated system of organ stops. It is apparent that the wiring involved in the switch circuits is extremely complex.

With the advent of electronics, many systems have been developed for creating organ tone by electronic means. One such system is described in U.S. Patent No. 2,649,006. While the electronic systems have made it possible to produce relatively compact and inexpensive substitutes for the tone-producing portion of the pipe organ, the switching and wiring requirements of the electrical instrument are essentially the same as for the pipe organ. Thus, when attempting to create electronic organs for mass sale at relatively low cost, the designers of such instruments have had to make serious compromises limiting the musical scope of the instrument in favor of simplification of the wiring.

This invention involves a system of wiring and soldering that is so compact, simple, and inexpensive to manufacture, that such compromises are no longer necessary.

Other advantages and ancillary features of the invention will become apparent as the description proceeds.

In the accompanying drawings:

FIGURE 1 is a general perspective view of a key-switch assembly frame and a junction board for an electronic organ, in which the wiring system is according to the invention, and produced according to the process herein disclosed;

FIGURE 2 is a perspective of a portion of the key-switch assembly frame on a larger scale, with the associated bus bars and control magnets included;

FIGURE 3 is a greatly enlarged plan view of an end portion of the junction board of FIGURE 1;

FIGURE 4 is a section as on line 4—4 of FIGURE 3;

FIGURE 9 is a view similar to FIGURE 7 showing the position and condition of the parts at the time of soldering;

FIGURE 10 is a diagrammatic section, as on line 10—10 of FIGURE 2;

FIGURE 11 is a side elevation of a single playing key and associated parts;

FIGURE 12 is a wiring chart;

FIGURE 13 is a perspective view of a hand tool for threading in the wiring; and

FIGURE 14 is a perspective of the end of a longitudinal member.

2

*The Key-Switch Assembly*

Figure 5:
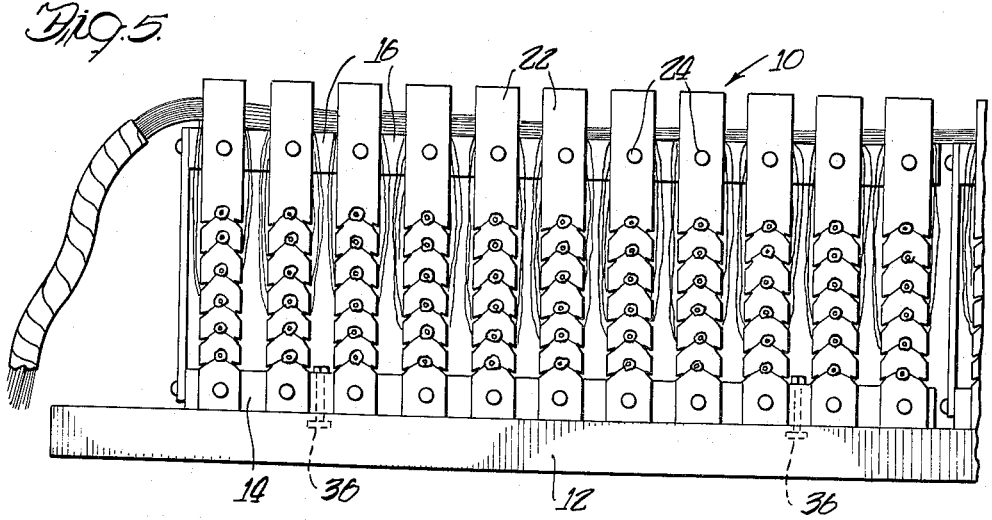
FIGURE 5 is a further enlarged rear elevation of one unit of the key-switch assembly frame of FIGURE 1.

In the embodiment selected to illustrate the invention, a key-switch assembly for an electronic organ is identified as a whole by the reference character 10. It includes a structural frame work comprising four wooden frame units bolted to the web of the steel channel 12. Each frame work unit comprises a lower imperforate piece of wood 14 and an upper panel 16 having two large openings 18 for convenient access to the space between the channels. Six posts 20 interconnect each panel into a rigid unit.

Figure 6:
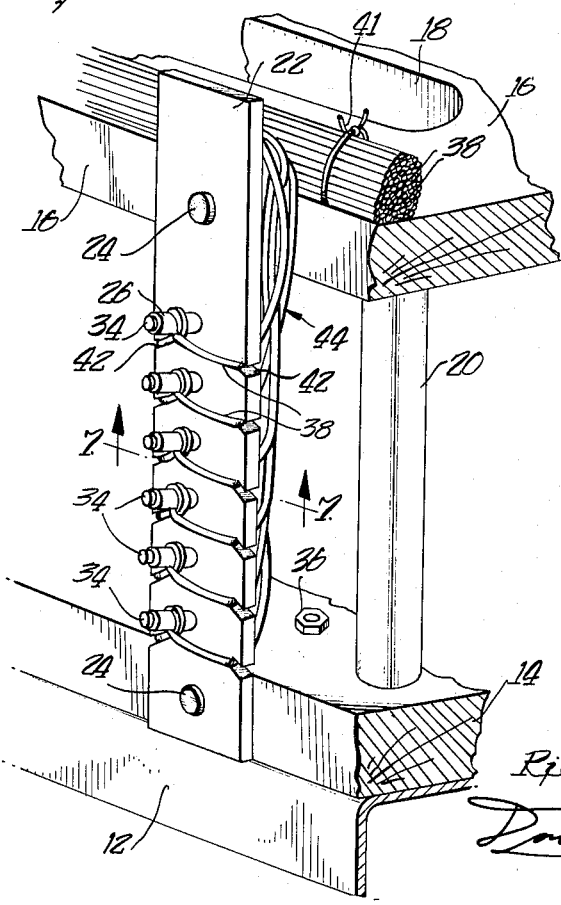
FIGURE 6 is a perspective of an individual riser before soldering.

Along the soldering side of each unit, as best shown in FIGURE 5, are eleven duplicate risers 22 suitably affixed to the frame as by brads 24. Each riser carries a plurality of tubular studs of which six are illustrated in FIGURE 6. Referring for greater convenience to FIGURES 7 and 8, each stud includes a tubular soldering end 26 and a friction end bifurcated into two horns 28 of arcuate cross-section. The tube 26 is formed with a collar 30 and the horns 28 each have a small projecting shoulder 32. The connector may be assembled with the riser 22 by gripping the soldering end 26 with a pair of pliers and pushing it through a preformed hole in the riser, which hole is a little too small to admit the shoulders 32 without some distortion by inward flexure of the horns 28. When the parts arrive in the relative positions of FIGURES 7 and 9, the lugs 32 will move out enough to prevent accidental dislodgement of the stud.

After assembly, with the riser, each stud receives a flexible cylindrical contact wire 34. This is of a size to slide without material friction in the soldering end 26, and its insertion pries the horns 28 apart into the position of FIGURES 7 and 9 and moves the shoulders 32 out to get firmer engagement with the risers 22, so that the assembled stud is held firmly in position by the gripping action of the collar 30 and the shoulders 32. The expanded horns 28 get a frictional grip on the wires 34 to hold them in place until they are permanently fastened in place by soldering.

Each frame unit is rigidly affixed to the web of the channel 12 as by means of a pair of bolts 36, indicated in FIGURE 5. Upon reference to the rear view of one unit in FIGURE 5, it will be apparent that each unit has sixty-six studs. Upon reference to the front view in FIGURE 1, it will be seen that there are four such units, so that the rear side of the key-switch assembly happens to have two hundred and sixty-four such studs, all projecting outwardly from the common plane defined by forty-four risers 22. The two hundred and sixty-four contact wires 34 constitute individual switch elements for engaging bus bars when the wires are deflected by the player of the instrument.

Figure 8:
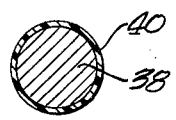
FIGURE 8 is a detail section on line 8—8 of FIGURE 7.

To complete a permanent electrical connection from each stud to the electronic sound-producing instrumentality corresponding to that stud, I provide a flexible conductor soldered to each stud. Referring first to FIGURE 8, each individual conductor 38 is a fine copper wire of circular cross-section about 0.015" in diameter. This wire carries a thin insulating coating, shown at 40 in FIGURE 8, completely encircling the same. The coating 40 is of a plastic composition that will melt and decompose at the temperature of molten solder, so that the naked wire is exposed to the solder whenever the hot solder engages the wire. Suitable plastic compositions having the desired properties include good quality nylon enamels, polyurethane isocyanate, and others.

Figure 7:
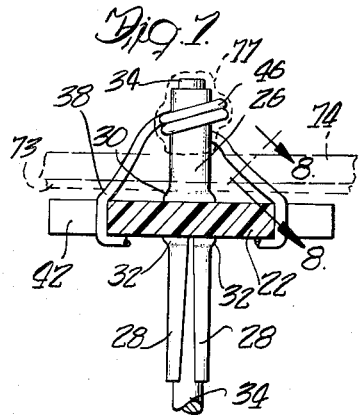
FIGURE 7 is a detail section on line 7—7 of FIGURE 5.

Referring now to FIGURES 6, 7, and 9, all the conductors 38 for the entire wiring assembly, or network, are laid along the top of the panels 16, in the angle partially housed by the projecting upper ends of the risers 22. These conductors can conveniently be tied together at intervals as indicated at 40 in FIGURE 6 by a simple piece of thread 41, or the like.

Each riser is provided with a pair of slots 42 for each of its studs 26, with the slots a trifle below the level of the associated stud. As clearly indicated in FIGURE 6, the appropriate conductor 38 separates from the top cable and extends downward as indicated at 44. This requires it to pass across the edge of the panel 16, but the thickness of the riser 22 provides the necessary offsets, so that this portion of the conductor does not extend beyond the plane defined by the exposed rear surfaces of the risers 22. Upon arriving at the slot corresponding to its stud, each conductor is laid in the bottom of the slot 42 and then over to the center and wound twice around the top of the stud, as best indicated at 46 in FIGURES 7 and 9. In doing this, the reach of wire extending from the slot 42 over to the tip of the stud is left a little slack, so that it can curve downwardly toward the riser and toward the collar 30, as indicated in the drawings. In a few instances, when the conductor 38 is not desired for subsequent connection to another stud, the conductor is cut off after winding it around the stud. But in the particular system of electrical connections appropriate for the electronic organ, nearly every conductor 38 is connected to several studs, and in that case the conductor is continued over to the slot 42 on the other side of the riser and passed through that slot and led back up again beside the riser to rejoin the top cable.

From the right end of the key switch assembly 10, all the insulated connectors 38 extend in a flexible reach 48 of cable to the end of the junction board, indicated as a whole by reference character 50. This junction board is a metallic channel 52 having narrow stiffening flanges 54. The channel 52 carries a series of twelve socket members 56 of insulating material, each fastened in place by a metallic retaining ring 58. Each socket member carries seven metallic terminals 60 projecting upwardly and is shaped to cooperate with a plug 62 carrying a corresponding number of prongs for a corresponding number of conductors united in a cable 64, for the delivery of actuating potential to a corresponding number of sound producing instrumentalities, such as oscillating electronic circuits.

In the particular electronic organ selected, one of the terminals 60 is for a common ground for all the plugs and each of the other six is connected to an individual oscillating circuit. From the reach 48, the individual conductors 38 separate to extend over to the appropriate terminal 60. A panel 66 of insulating material is bolted to the channel 52, and the cable reach 48 is housed under the panel and in the angle defined by the panel and the adjacent channel flange 54. Abreast of each socket 56, the panel 66 is provided with a pair of deep slots 68 defining a tongue 70 between them. Each individual conductor, upon separation from the cable 48, passes up through one of the slots 68 and across the finger 70 at 71 and down through the opposite slot and back across under the finger 70 and up again through the first slot and then across the web of the channel and up beside one of the terminals 60 to be twisted around it two or three times, as indicated at 72 in FIGURE 4. In this particular electronic organ, each conductor 38 ends at one of the terminals 60 because it is not employed to deliver actuating voltage to more than one sound-producing instrumentality. It will be obvious that in a wiring assembly where it is desired to have any of the conductors 38 connected to a plurality of terminals 60, that can be done by continuing the conductor to wind around another terminal in the same plug or by running the conductor back to one of the slots 68, and then along the junction board to some other plug.

In affixing the end of the conductor 38 to the terminal 60, a little slack is left in the adjacent reach of the conductor, so that it can extend across close to the channel 52 to the base of the plug 56, and then up to the tip of the terminal 60. In the particular electronic organ disclosed herein, there happen to be 72 independent oscillating circuits for generating sound, and accordingly, the junction board is provided with twelve plugs 56 each carrying seven terminals, making up a total of twelve ground terminals and six oscillator terminals for each plug.

*The Soldering Process*

Referring now to FIGURES 6, 7, and 9, the condition of the parts in FIGURE 6 is that obtaining before the ends of the studs 26 have been united to the ends of the contact wires 34 by soldering and to the adjacent portions of the conductors 38. The switch assembly 10 is now positioned with the parts in the position of FIGURE 7 and a temporary protective shield 74 is applied. One very satisfactory material for such a shield is a fairly heavy, porous sheet of paper of the type commonly employed in cheap pencil scratch pads for school children, but a single sheet of newsprint will work fairly well. This protective shield is simply laid as a cover over the entire key switch assembly and then pushed down to the position of FIGURE 7, so that the studs 26 tear holes in the shield and project above it. A quick and convenient way for pushing the shield 74 down into position is to lay a soft, sponge-rubber blanket on top of the shield and press down gently. Depending on operating conditions, the paper shield 74 may be preceded by an aluminum foil 73 applied in the same way.

The next step is to apply a small amount of soldering flux to the projecting tip of each stud 26, which can be done quite quickly with a small brush or spray. A little of this flux moistens the adjacent surface of the shield 74, which is an advantage because the moisture helps protect the shield against the heat of the solder.

The next step is to invert the entire key switch assembly to the position of FIGURE 9 and lower it into a bath of molten solder. In FIGURE 9, the level of the solder is indicated at 76. When the parts are thus positioned, the heat of the molten solder melts the insulation 40, and the stud 26 and contact wire 34 and the turns 46 of the conductor 38, all stand naked and freshly cleaned with flux, and immersed in the solder, which permeates by capillary action and forms a coating of solder 77, completely investing and covering up the turns 46. The solder also extends up quite a little way in the annular space between the wire 34 and the stud 26.

Immersion of the studs 26 is all that is necessary to complete the soldering action proper, and the entire switch assembly is lifted up again. The shield 74 is now stripped off and thrown away. It will occasionally be somewhat scorched by the heat from the solder, but during the short period of immersion involved, it has protected the risers 22 and other adjacent parts from injury by the heat of the solder. It also serves a very important purpose by absorbing the melted residue from the coating, to leave the soldered joint clean and neat.

Referring now to FIGURES 3 and 4, it will be obvious that the projecting terminals 60 can be provided with a protective shield in the same identical way and moistened with flux and soldered by immersion precisely as in FIGURE 9, but only down to plane of the line 75.

Where the physical dimensions of the complete key switch assembly should advantageously be kept a minimum, as in the electronic organ disclosed, a good working size for the risers 22 is a width of $5/16$ of an inch and a thickness of $1/16$ with a spacing of $3/16$ of an inch between adjacent risers. Because the slot between the risers is too narrow to permit the finger of a normal hand to pass through it, I provide a special tool illustrated in FIGURE 13 for the quick and easy handling of the conductor 38 in putting it into the position illustrated in FIGURE 6. The shank 78 of the tool may be about ⅜ of an inch in diameter, more or less, and 6" or 8" long, so that it can be grasped with one hand just as an ordinary lead pencil. The conductor 38 is threaded through a bore in the shank, and the lower end of the tool is tapered at 80 to end in a short tubular tip 82, which may advantageously have outside diameter as small as 3⁄32 of an inch, or a little less. Between the tip 82 and the shank 78, one side of the tool is cut away at 84 to expose the conductor 38. This is a convenience in threading the tool. From the upper end of the shank 78, the conductor 38 runs to a source of supply indicated as a spool 86.

It will be apparent that each conductor 38 can be started at one end, either at the junction board end or at the most remote of the studs 26 with which it is to be connected. FIGURE 13 indicates the position of the parts when the conductor 38 was started at a stud below that shown in the drawing and has been brought along beside the panel 16 and over the same into the position in the drawing. The operator need only lower the tool another sixteenth of an inch to engage the conductor 38 in the slot 42, which will draw the reach indicated at 88 snug. The operator can then raise the tool, which will draw the conductor 38 through the tool until an appropriate slack has been secured and the tip 82 can describe two circles around the upper end of the stud 26 and then be drawn laterally to one side to pull through enough more wire to include the reach running down to the adjacent slot 42. Then the wire is tucked into the adjacent slot 42 and a movement of the tip of the left will draw a new reach of wire in the direction of the arrow 90 up over the panel 16 to rejoin the main cable.

It will be understood that there is no separation of a conductor from the main cable in the assembly process. The main cable results from the successive addition of one wire at a time until all seventy-two wires have been connected, each to a plurality of studs 26 and each to one of the terminals 60. Each stationary riser 22 has been illustrated as supporting six studs 26, which carry the six contact wires 34, as best illustrated in FIGURE 10.

Along the front side of each frame unit, in alignment with each of the stationary risers 22, I provide a series of movable risers, or contact lifters, 92. These contact lifters 92 may be of identical cross-section, but they are set in notches in the edges of the panels 14 and 16, and restrained from forward movement by suitable means, such as a retaining rod 95. Each of the contact lifters 92 is provided with six apertures through which the contact wires 34 extend with sufficient clearance for free articulation at the point of engagement. Beyond the contact lifter 92 each contact wire 34 extends forward an additional distance of the same order of magnitude as the depth of the frame. Above the projecting portion of each contact wire 34, I position a fiber-glass rod or longitudinal member 94. All six longitudinal members are supported with freedom of rotary movement only, by a series of partitions 96, five of which are affixed to the ends of the frame units. The left partition 98 is mechanically affixed to the left end of the channel 12.

Each longitudinal member 94, throughout the portion that overlies the contact wires 34, is provided with a silver bus bar 100. This is a fine silver strip of rectangular cross section fixed in a slot in the fiber-glass longitudinal member. Upon reference to FIGURE 10, it will be apparent that any selected longitudinal member may be rotated clockwise to bring its bus bar 100 into position to be engaged by the adjacent contact wire 34 when that wire is lifted up into such contact by elevating the associated contact lifter 92. Thus, in FIGURE 10, I have illustrated the second bus bar from the bottom facing directly downward and the other five facing horizontally to the right, and the contact lifter 92a in lifted position with all six contact wires pressing against their associated longitudinal members. But only the second contact wire from the bottom will encounter a bus bar, and that will be the only electrical circuit completed by elevating the lifter 92a. In this instance, the result is that only one oscillating circuit is activated while five other oscillating circuits that might be activated by lifting the same lifter 92a remain inactive because the corresponding longitudinal members 94 are turned into inoperative position.

Operator-controlled means are provided for the selective positioning of any desired combination of longitudinal members in position to render the corresponding bus bars operative.

All six longitudinal members extend beyond the last partition 96 to the end partition 98 and extend past a series of six electro-magnets. The armatures 102 for these magnets are pivoted on horizontal axes 104. A flexible actuating thread 106 is provided for each longitudinal member, being wound clockwise two or three times around the longitudinal member, and then extending rearwardly at 108 and under a guide pin 110 and upwardly at 112 to be wrapped around an adjusting screw 114 held in adjusted position by a lock nut 116. A helical spring 118 is telescoped over the projecting end of each longitudinal member 94. The end of the spring adjacent the partition 98 is extended over and hooked around the edge of the partition at 120 to secure a purchase. The other end of the spring terminates in a loop 122 which is normally seated in a diametrical slot in the end of the longitudinal member 94. The tension of this spring can be adjusted by withdrawing the loop 122 axially and rotating it clockwise about the axis of the longitudinal member 94 until the desired tension is built up and then replacing the loop 122 in its slot. Thus all six longitudinal members are resiliently urged counter-clockwise toward the inoperative position, but when the player provides actuating current for the corresponding magnet, the longitudinal member will turn and present its bus bar to each contact wire 34 that is elevated by the player by means of the playing keys 128, and this condition will obtain as long as the magnet remains active. In FIGURE 10, the second bus bar 100a from the bottom is in operative position and the third armature 102a from the left end in FIGURE 2 is active, and connected to the longitudinal member 94a second from the bottom.

Means are provided for the selective lifting of predetermined contact lifters 92 to activate the oscillating circuits or the combinations of oscillating circuits desired in connection with each key of the key board. Referring to FIGURE 11, fixed rails 124 and 126 underlie the keys of the keyboard, of which one key 128 is illustrated. The rail 124 is provided with a felt washer 130, and a stationary pivot pin 132 extends up through the washer and through a slot 134 in the key 128.

The pivotal movement of the key 128 is restrained in both directions. Downward movement of the key will bring the key into engagement with the stop felt 136 on the rail 126. In FIGURE 11, the key is at the upper limit of its movement and is restrained from further upward movement by felt washer 138 carried by the adjustment screw 140 and engaging the lower surface of the rail 126.

A suitable bias is provided for holding the key 128 in the position of FIGURE 11 except when depressed by the finger of the player. The tension spring 142 runs up from a lower arm 144, rigidly mounted on the rail 124, to pull down on the key at 146. The mechanical connection from the key 128 to the contact lifter 92 is a strip of metal 148 affixed to the lower side of the key and extending first downward at 150 and then back at 152 to underlie the lower end of the contact lifter. A thin felt pad 153 assures complete silence when the parts are moved into the position of FIGURE 10.

For complete silence and complete certainty of movement under all operating conditions, it is desirable that each contact wire 34 should at all times be in mechanical contact with the contact lifter 92a. As best indicated in FIGURE 10, the rear side of the frame made up of the bottom panel 14 and top panel 16 is inclined upwardly and forwardly so that all the studs 26 have their axes inclined slightly downward and forward. Thus, when the contact lifter 92 is in its lower position, the reach of the contact wire between the stud 26 and the lifter 92 will curve downward slightly and each wire 34 will press downward lightly on the lifter 92 at the point where the wire passes through the lifter. The reaches in front of the lifter will be straight, and will lie out of contact, or barely in contact, with the longitudinal members 94 below the ones with which they make electrical contact when lifted. In a typical unit the vertical displacement of the contact lifter is of the order of magnitude of 1/16" or 3/32", but that displaces the forward reaches substantially twice as much in the plane of the longitudinal members 94. The parts are so proportioned that when the lifter is elevated, the reach between the lifter and the bus bar 100 is flexed slightly in the opposite direction and curves upwardly between its two contact points to exert sufficient pressure on the bus bar 100 to prevent any normal vibration of the instrument as a whole from causing any interruption of effective electrical contact.

Figure 12:
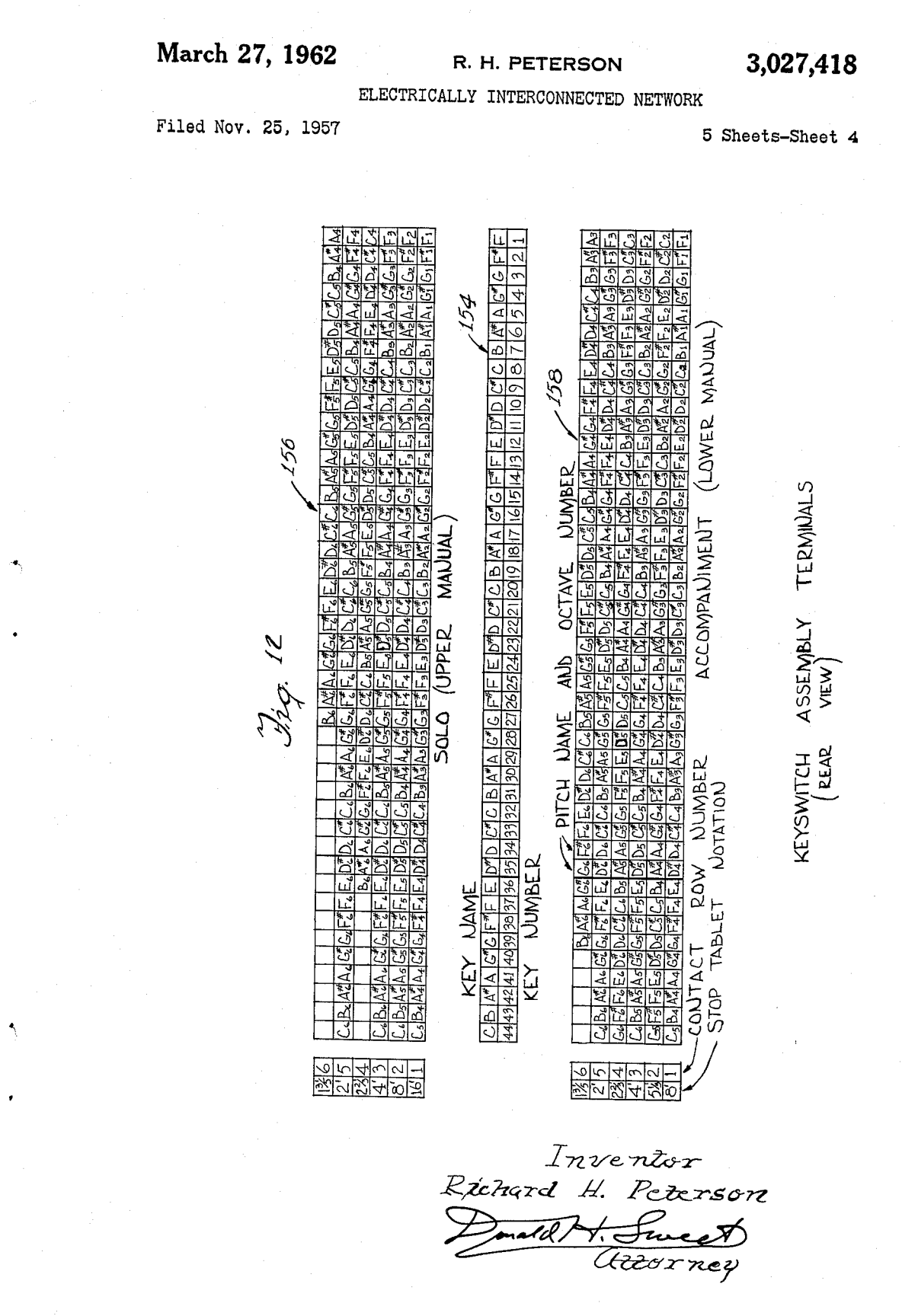

It will be obvious that the type of completely interconnected network disclosed can be used for a wide variety of equipment. FIGURE 12 is a diagram of one specific arrangement of the connections when the equipment includes one set of soldered terminals where certain terminals are interconnected as in the key switch assembly of an electronic organ and another set of terminals where substantially all the soldered joints are independent of each other. The center panel 154 of the diagram indicates the positions of forty-four keys, and the note of the diatonic scale corresponding to each. The organ has two complete sets of forty-four keys, and the upper, or solo, diagram 156 indicates the names of all the oscillators that can be rendered operative by depressing the corresponding kep provided all the corresponding bus bars indicated by the numbers at the left "1, 2, 3, 4, 5, and 6" have been turned into operative position. It will be obvious that the player can turn any selected assortment of these six bus bars into operative position, leaving the remainder inoperative. In normal operation, this will be done frequently to secure different desirable aesthetic tone qualities.

The lower diagram 158 indicates the oscillators that can be rendered active by the playing keys of the accompaniment manual, and it will be noted that the assortment of overtones is different for the accompaniment manual than it is for the solo manual.

For clearness it is noted that the one-piece naked resilient conductors 34 that function as soldering termini on the outer side of the septum defined by the risers 22 are conveniently identified as a first set of conductors; and the flexible insulation-coated conductors 38 are identified as the second set. Also, the risers 22, jointly, constitute a septum and define apertures with notched edges, and protect the cable on the shelf behind it, which shelf is defined by the adjacent portion of the frame top.

Others may readily adapt the invention for use under various conditions of service by employing one or more of the novel features disclosed, or equivalents thereof. As at present advised, with respect to the apparent scope of my invention, I desire to claim the following subject matter.

I claim:

1. A wiring assembly comprising, in combination: an elongate support having a longitudinal septum; said septum having one side identified as "outer" and an opposite side; said septum having a series of longitudinally spaced openings; a multiplicity of first electrical conductors arranged in groups between said septum openings; the first conductors in each group being spaced apart transversely; each first conductor having a terminal reach extending outwardly from said septum to terminate in a remote outer end; a multiplicity of flexible second conductors each interconnecting a plurality of preselected first conductors; certain of said second conductors each extending longitudinally along the opposite side of said septum, then at a predetermined point out through one of said openings, then engaging the remote end of a near-by first conductor, then back through one of said openings and again on the opposite side of said septum to another opening, then through said second opening and out to engage the remote outer end of another first conductor; and individual masses of solder investing the remote ends of said first conductors, together with the portions of said second conductors engaging said remote ends; said remote first conductor ends being all spaced away from said septum; whereby all said solder masses can be applied by dipping, with said septum spaced above said solder to protect it from the heat thereof.

2. Equipment according to claim 1 in which each first conductor has a second portion extending away from the opposite face of said septum to deliver potential to, or transmit potential from said reach.

3. A combination according to claim 1 in which said septum is provided with an inwardly extending longitudinal shelf defining a trough along one longitudinal edge of said septum; the portions of said second conductors extending longitudinally along the opposite side of said septum being laid together in said trough in a multi-conductor cable.

4. A combination according to claim 1, in which said septum openings have notches along their edges, adapted to receive and retain said second conductors disposed in said notches en route to and from the engagements with the remote ends of said first conductors.

5. The method of producing a key switch assembly for electronic organs which comprises: assembling a first multiplicity of conductors on a support with their termini all projecting from the same side of said support and spaced away from said support; threading in a second multiplicity of relatively flexible insulated conductors; many of said insulated conductors being each threaded along the protected side of said support remote from the termini of said first conductors, and at a predetermined point out into a first engagement with the terminus of one of said first conductors; many of said insulated conductors being continued beyond said first engagement and being threaded back again from said first terminus to said protected side of said support, and along said support to a different predetermined point and out again to engage the terminus of another first conductor, and so on in a predetermined pattern; by continuation completing an assembly in which many of said insulated conductors engage two or more first conductors, and many first conductors engage two or more insulated conductors, all in predetermined patterns; positioning an absorbent and heat insulating barrier over the surface of said support, with said first conductor termini projecting through said barrier; applying flux to said termini and the insulated conductor portions engaged therewith; presenting said termini to a solder bath and by the heat of said bath dispelling the insulation on said insulated conductors and forming permanent electrical union between each terminus and all its associated conductor portions; protecting said support and all but the soldered portions of said conductors from heat injury and contamination, by the action of said barrier; and removing the termini from the solder.

6. A method according to claim 5, in which said barrier is applied in two laminae; a first metallic layer having properties tending to minimize heat transfer, and a second layer of absorbent material positioned next the solder and adapted to absorb contaminant generated during the soldering process.

(References on following page)

References Cited in the file of this patent

UNITED STATES PATENTS

| | | |
|---|---|---|
| 453,863 | Hibbard | June 9, 1891 |
| 1,122,290 | Mack et al. | Dec. 29, 1914 |
| 1,639,310 | Richardson | Aug. 16, 1927 |
| 2,253,136 | Richter et al. | Aug. 19, 1941 |
| 2,585,010 | Heckman | Feb. 12, 1952 |
| 2,627,554 | Earle | Feb. 3, 1953 |
| 2,632,814 | Ostline | Mar. 24, 1953 |
| 2,648,356 | Beauliew | Aug. 11, 1953 |
| 2,720,808 | Sihpol | Oct. 18, 1955 |
| 2,756,485 | Abramson et al. | July 31, 1956 |
| 2,846,659 | Hinspater et al. | Aug. 5, 1958 |
| 2,846,916 | Osborne | Aug. 12, 1958 |